United States Patent [19]
Decker et al.

[11] Patent Number: 5,634,700
[45] Date of Patent: Jun. 3, 1997

[54] SLIP-CONTROLLED BRAKE SYSTEM FOR COMMERCIAL VEHICLES

[75] Inventors: Heinz Decker, Vaihingen; Manfred Walter, Ditzingen, both of Germany

[73] Assignee: Robert Bosch GmbH, Stuttgart, Germany

[21] Appl. No.: 612,136

[22] Filed: Mar. 7, 1996

[30] Foreign Application Priority Data

Mar. 10, 1995 [DE] Germany .................. 195 08 559.0

[51] Int. Cl.⁶ ............................................ B60T 8/00
[52] U.S. Cl. ................................. 303/186; 303/119.1
[58] Field of Search ............................. 303/186, 187, 303/188, 189, 113.5, 119.1, 113.1

[56] References Cited

U.S. PATENT DOCUMENTS

| | | | |
|---|---|---|---|
| 4,088,376 | 5/1978 | Lindemann et al. | 303/186 |
| 4,842,342 | 6/1989 | Takahashi et al. | 303/186 |
| 4,850,650 | 7/1989 | Eckert et al. | 303/186 |
| 5,255,962 | 10/1993 | Neuhaus et al. | |
| 5,397,174 | 3/1995 | Willmann . | |
| 5,462,342 | 10/1995 | Goebels | 303/186 |

FOREIGN PATENT DOCUMENTS

| | | |
|---|---|---|
| 0227332 | 7/1987 | European Pat. Off. . |
| 0467112 | 6/1991 | European Pat. Off. . |

*Primary Examiner*—Lee W. Young
*Attorney, Agent, or Firm*—Edwin E. Greigg; Ronald E. Greigg

[57] ABSTRACT

A slip-controlled brake system for commercial vehicles with a hydraulic transmission device for which the cost of the system is reduced. Each axle of the vehicle is assigned a hydraulic control unit, with an electronic control unit, of a slip-control device for passenger vehicles. The hydraulic control unit has four hydraulic channels (K1, K2, K3, K4). Brake lines which connect a master cylinder of the brake system to wheel cylinders are routed in each case via two channels (K1, K2, K3, K4) of the hydraulic control unit, which are connected in parallel, in order to achieve a sufficiently large volume flow of pressure medium. Connected to the corresponding control unit are two wheel speed sensors assigned to the wheels of the respective vehicle axle. The control units are connected electrically for the exchange of wheel speed sensor signals. The brake system can be implemented in an advantageous manner on light commercial vehicles.

3 Claims, 1 Drawing Sheet

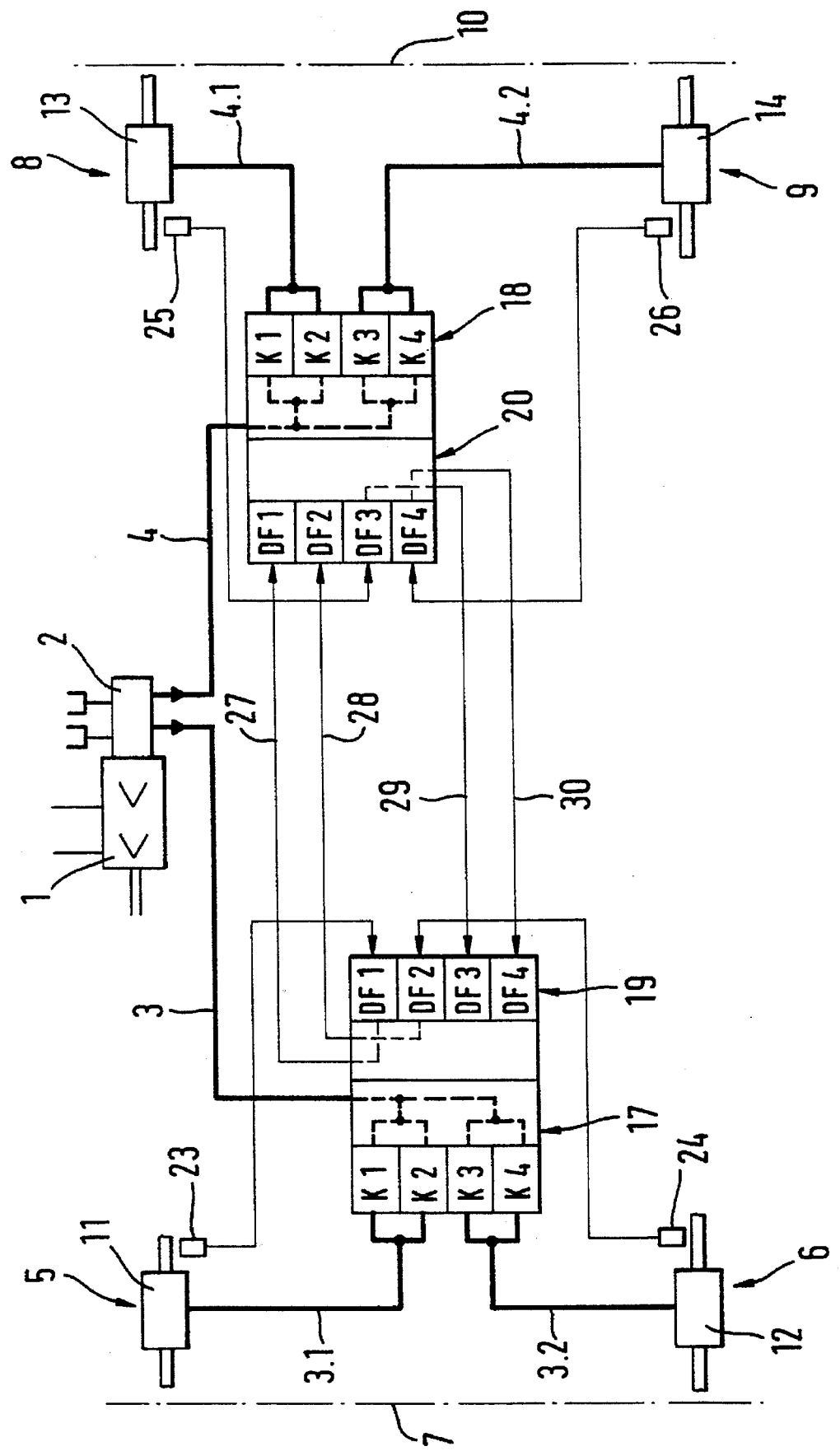

SLIP-CONTROLLED BRAKE SYSTEM FOR COMMERCIAL VEHICLES

PRIOR ART

The invention relates to a slip-controlled brake system with a hydraulic transmission device for commercial vehicles.

Vehicles of this kind have a master cylinder from which, depending on the division of the brake circuits, brake lines lead to wheel cylinders of relatively large volume in comparison with passenger-vehicle brake systems. To equip such commercial-vehicle brake systems with control devices for brake-slip and, if required, traction control it is therefore necessary to provide a hydraulic unit of such an arrangement that has correspondingly large line and valve cross sections in the respective hydraulic channel in order to achieve sufficient rapidity of response in the slip control. A hydraulic unit of this kind cannot be manufactured in large batch numbers and, accordingly, a brake system of this kind is relatively expensive.

Thus, EP 0 227 332 A2 discloses the possibility, in the case of an all-wheel-drive vehicle with a hydraulic brake system, of assigning each wheel brake of the front axle a slip control device with a hydraulic unit and an electronic control unit, while a common device of the same kind is arranged upstream of the wheel brakes of the rear axle. These are hydraulically single-channel embodiments of hydraulic units which are matched to the respective location of use. No mention is made of interlinking the control units.

DE 42 27 083 A1 has furthermore disclosed a brake system which has two electronic control units, each assigned to one axle of a vehicle. One control unit forms a single unit with a two-channel pressure-control device, while the other control unit has two spatially separated pressure control valves connected downstream of it. Connected to each control unit are two wheel speed sensors assigned to the wheels of the corresponding axle. The control units are designed for the exchange of the signals generated by the wheel speed sensors to allow determination of the reference speed required for a slip control operation. Because of the difference in the equipment assigned to each axle in the brake system, only limited cost advantages can be achieved with this known embodiment.

Moreover, EP 0 467 112 A2 has disclosed an electronic brake system for road vehicles in which each wheel brake is assigned a "wheel module". This comprises a modulation valve for controlling the associated brake cylinder, corresponding electronics and the connection of a wheel speed sensor. Also provided is at least one central module in the form of an electronic control unit, to which the wheel modules, connected to it by a data bus, are hierarchically subordinated. If two central modules are provided, these are connected by another data bus for the purpose of information exchange and mutual monitoring. If there is an antilock or traction-control function, a reference speed is determined in the central modules and fed to the wheel modules via the data bus. In this embodiment, the outlay on the electronics is relatively high.

ADVANTAGES OF THE INVENTION

In contrast, the brake system according to the invention has the advantage that it is possible to use economically producible hydraulic units with an electronic control unit, that provides sufficiently large volume flow to the respective wheel cylinder, and that, to allow the determination of the reference speed, the control units are designed for exchange of the wheel speed sensor signals but are otherwise largely self-contained.

Advantageous further developments of the brake system according to the invention are given herein.

BRIEF DESCRIPTION OF THE DRAWINGS

An exemplary embodiment of the invention is illustrated in simplified form in the drawing using a block diagram of a brake system for commercial vehicles and is explained in greater detail in the description which follows.

DETAILED DESCRIPTION OF THE EXEMPLARY EMBODIMENT

The slip-controlled brake system illustrated in the drawing, which has a hydraulic transmission device and is intended for commercial vehicles, has a pneumatic dual-circuit brake unit 1 with a flanged-on tandem master cylinder 2. Emanating from this are a brake line 3 of a first hydraulic brake circuit I and a brake line 4 of a second hydraulic brake circuit II. Brake circuit I is assigned wheel brakes 5 and 6 of a front axle 7 and brake circuit II is assigned wheel brakes 8 and 9 of a driven rear axle 10 of the commercial vehicle. Brake line 3 is therefore connected by a brake line branch 3.1 to a wheel cylinder 11 of wheel brake 5 and by a brake line branch 3.2 to a wheel cylinder 12 of wheel brake 6. In brake circuit II, branches 4.1 and 4.2 of brake line 4 are connected in corresponding fashion to wheel cylinders 13 and 14, respectively, of wheel brakes 8 and 9.

Each axle 7 and 10, respectively, of the vehicle is assigned a hydraulic unit 17 and 18, respectively, with an electronic control unit 19 and 20, respectively, of a slip control device for passenger vehicles. The respective hydraulic unit with control unit is preferably also mounted close to the axle on the vehicle frame or body. One such hydraulic unit is known from DE 41 32 470 A1. Hydraulic units of this kind, which are manufactured in large batch quantities have four hydraulic channels assigned to the respective wheel brakes of the vehicle. These channels are assigned solenoid valves for the modulation of the brake pressure fed into the respective wheel brake in the case of a brake slip control operation. In addition to other hydraulic elements, a hydraulic unit of this kind furthermore contains a high-pressure pump to pump a pressure medium taken from the wheel brakes during a brake slip control operation to the master cylinder. If the hydraulic unit is also designed for traction control, then, in conjunction with further solenoid valves, the high-pressure pump is also capable of building up brake pressure in the wheel cylinders of the vehicle.

In the present exemplary embodiment with dual-circuit brake division, the hydraulic unit 17 assigned to the non-driven front axle 7 is designed to carry out brake slip control while the hydraulic unit 18 assigned to the driven rear axle 10 is additionally designed to carry out traction control. If, departing from the exemplary embodiment, the vehicle has two driven axles, identical hydraulic units for brake-slip and traction control can be used on both. In the respective hydraulic units 17 and 18, brake lines 3 and 4 enter the two line branches 3.1, 3.2 and 4.1, 4.2 respectively. As can be seen from the broken lines representing the routing of the lines within the respective hydraulic units 17 and 18, the brake line branches are themselves again branched there and routed via two channels in the corresponding hydraulic unit 17 or 18. In the case of brake line branch 3.1, this runs via channels K1 and K2 of hydraulic unit 17, which are connected in parallel, while brake line branch 3.2 is routed via channels K3 and K4 of hydraulic unit 17, which are connected in parallel. In hydraulic unit 18, brake line branch 4.1 runs via channels K1 and K2, which are connected in parallel, while brake line branch 4.2 runs via channels K3 and K4, which are connected in parallel. This ensures that, when hydraulic units 17 and 18 matched to brake systems of passenger vehicles with small-volume wheel cylinders are used, the wheel cylinders 11, 12, 13, 14 of the commercial vehicle are supplied with pressure medium with a sufficiently large volume flow and in a largely unrestricted manner and slip control can be carried out with a high rapidity of response.

The electronic control units 19 and 20 receive, amplify and filter sensor signals, measure and differentiate speeds and calculate from these the reference speed of the vehicle, the brake slip or tractive slip and the peripheral retardation or acceleration of the wheels of the vehicle axle assigned to the respective control unit. Essential elements of such a control unit are an input circuit for electrical signals from wheel speed sensors assigned to the wheels of the vehicle, a digital controller for slip control, output circuits and an output stage for switching the solenoid valves assigned to the channels of the hydraulic unit and switching the pump drive. An electronic control unit of this kind is described in "Bosche Technische Unterrichtung: Pkw-Bremsanlagen" [Bosch Technical Instruction Manual: Passenger Vehicle Brake Systems], Robert Bosch GmbH, Stuttgart, 1st Edition, September 1989, pages 21 and 22.

In the exemplary embodiment under consideration, a wheel speed sensor 23 assigned to wheel brake 5 is connected to an input DF1, while a wheel speed sensor 24 assigned to wheel brake 6 is connected to an input DF2 of the control unit 19 assigned to the front axle 7. At the control unit 20 assigned to the rear axle 10, the inputs DF3 and DF4 are connected to wheel speed sensors 25 and 26 assigned to wheel brakes 8 and 9. To transmit the speed sensor signals obtained at one axle of the vehicle to the control unit of the other axle, electric signal lines 27, 28, 29, 30 are provided, of these line 27 being used to transmit the signal DF1 input from wheel speed sensor 23 from control unit 19 to signal input DF1 of control unit 20 and, in a corresponding manner, signal line 28 is used to transmit the signal DF2 from control unit 19 to control unit 20. Conversely, lines 29 and 30 are used to transmit the signals DF3 and DF4 of wheel speed sensors 25 and 26 from control unit 20 to inputs DF3 and DF4 of control unit 19. Instead of the signal lines 27 to 30, the two control units 19 and 20 can also be connected by a data bus. The control units 19 and 20, which are largely self-contained apart from the data transmission described, for which the transmitting control unit amplifies the signals, are capable of carrying out the calculations mentioned for slip control.

The foregoing relates to preferred exemplary embodiments of the invention, it being understood that other variants and embodiments thereof are possible within the spirit and scope of the invention, the latter being defined by the appended claims.

We claim:

1. A slip-controlled brake system with a hydraulic transmission device for commercial vehicles with at least two axles, having the following features:

a master cylinder (2) is provided from which brake lines (3, 3.1, 3.2; 4, 4.1, 4.2) lead to wheel cylinders (11, 12; 13, 14), each axle (7, 10) of the vehicle is assigned a hydraulic unit (17, 18), with an electronic control unit (19, 20), of a slip-control device for passenger vehicles, the hydraulic unit (17, 18) has four hydraulic channels (K1, K2, K3, K4), the brake lines (3, 3.1, 3.2; 4, 4.1, 4.2) connected to the wheel cylinders (11, 12; 13, 14) are routed via in each case two channels (K1, K2; K3, K4) of the hydraulic unit (17, 18), which are connected in parallel, two wheel speed sensors (23, 24; 25, 26) assigned to the wheels of the respective vehicle axle (7, 10) are connected to the control unit (19, 20), the control units (19, 20) are connected electrically at least for the exchange of wheel speed sensor signals.

2. A hydraulic brake system as claimed in claim 1, wherein the hydraulic units (17, 18) together with their control units (19, 20) are arranged close to the axles.

3. A hydraulic brake system as claimed in claim 1, wherein in the case of a driven vehicle axle, the slip control device is designed not only for brake slip control but also for traction control.

* * * * *